United States Patent Office 3,260,429
Patented July 12, 1966

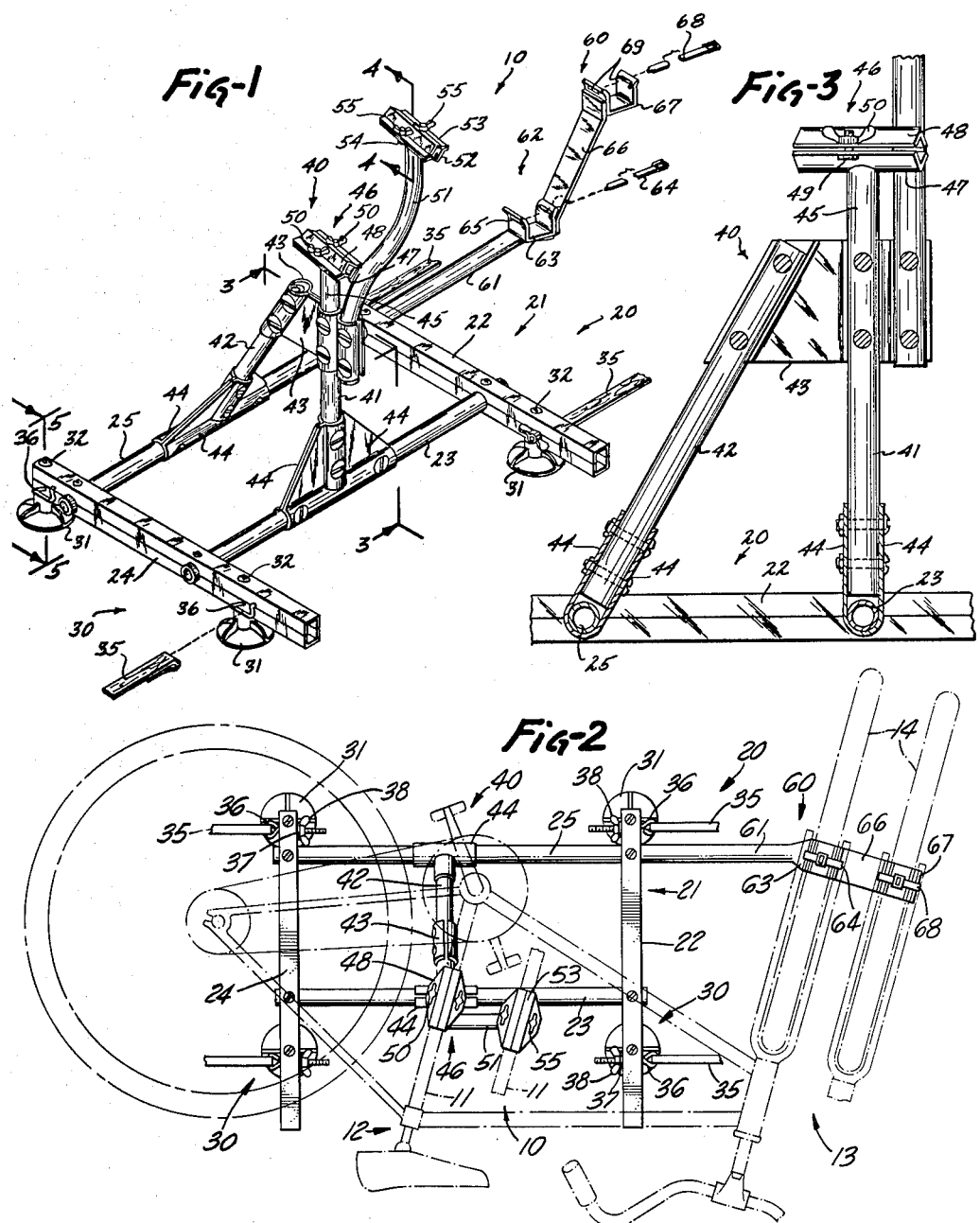

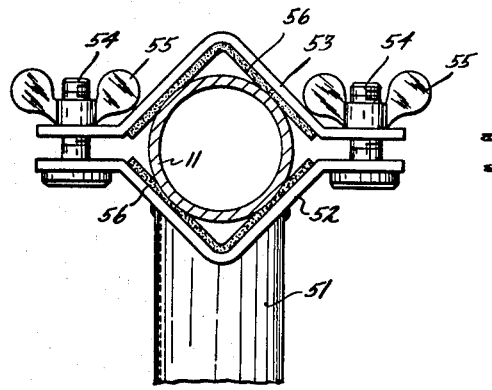
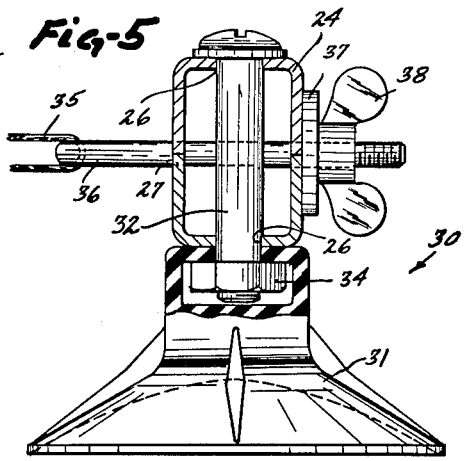
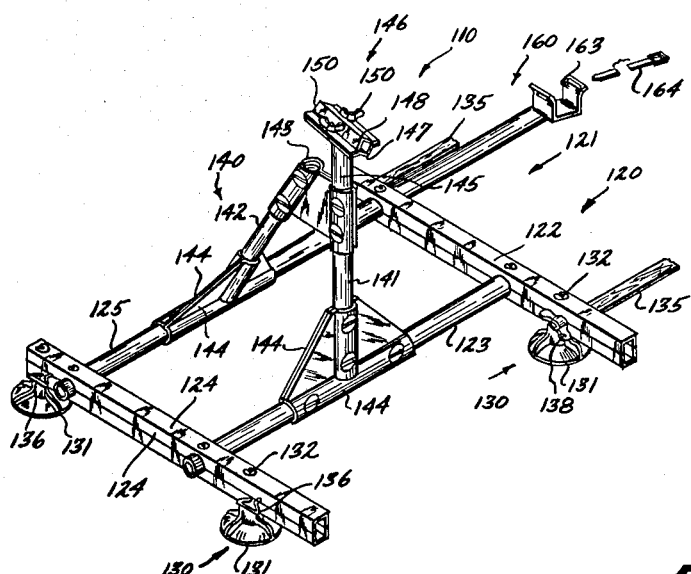
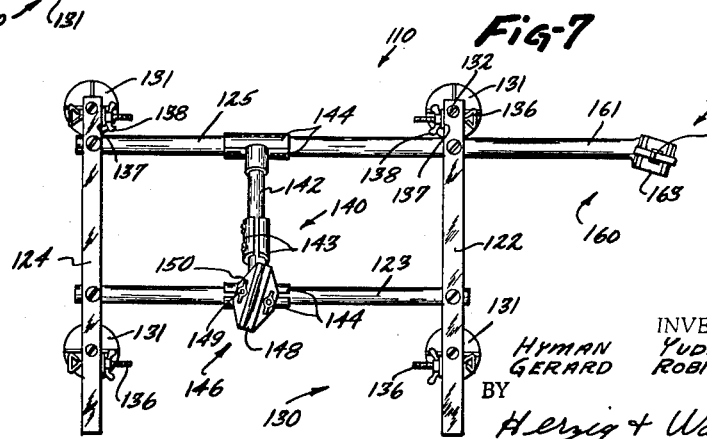

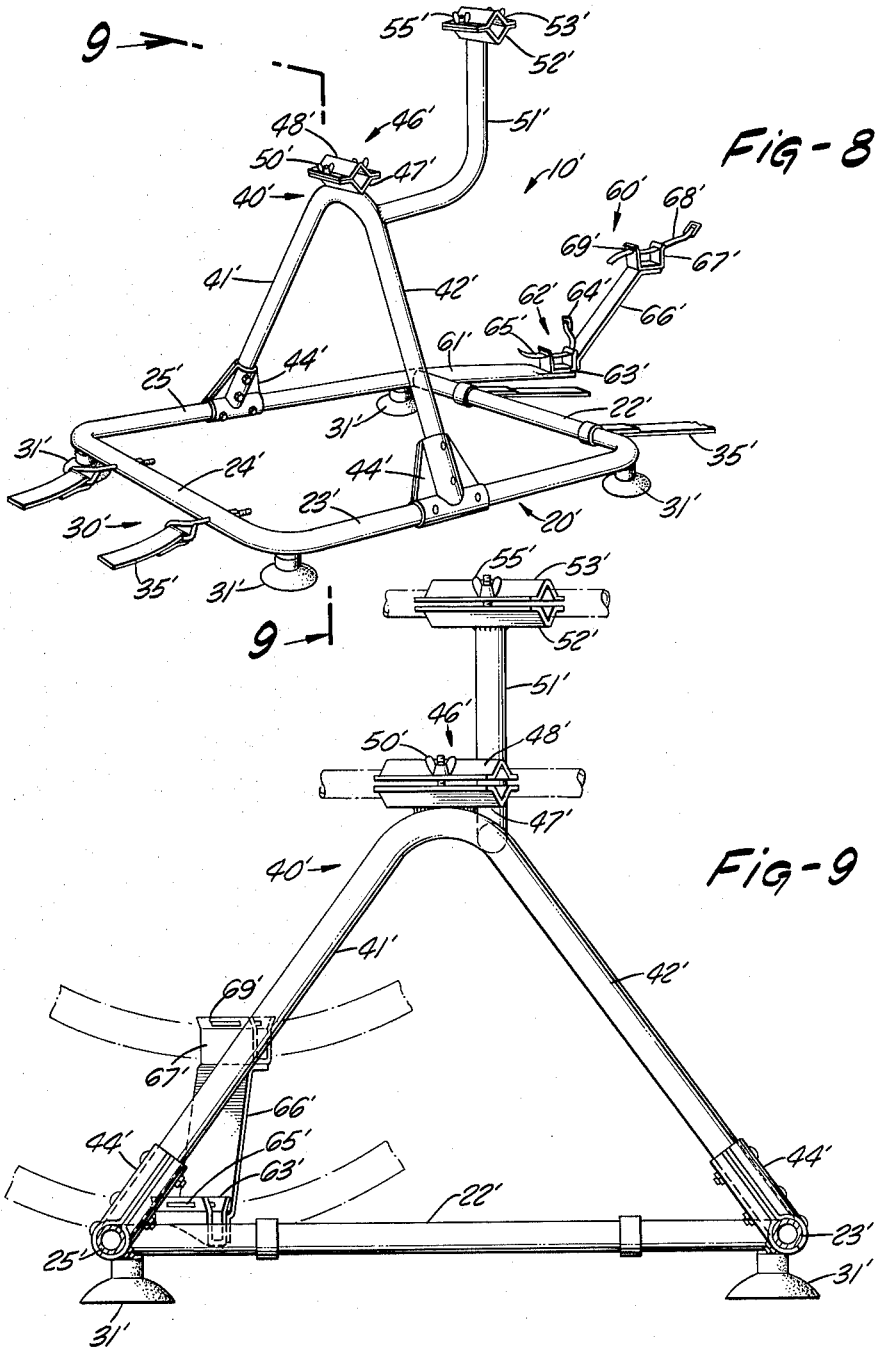

3,260,429
AUTOMOBILE BICYCLE CARRIER
Hyman Yuda, Los Angeles, and Gerard Robinson, Harbor City, Calif., assignors of one-third to Michael Schiller, Beverly Hills, Calif.
Filed Jan. 11, 1965, Ser. No. 424,653
1 Claim. (Cl. 224—42.1)

This application is a continuation-in-part of application No. 332,135, filed December 20, 1963 which has been issued as Patent No. 3,204,839.

In general, the present invention involves a bicycle carrier specifically adapted to be mounted on an automobile and to carry one or more bicycles. More particularly, the present invention involves an easily installed and removed integral automobile bicycle carrier adapted to hold securely and compactly at least one bicycle.

Because of the popularity of bicycle riding, not only as a competitive sport, but also as a means of relaxation and exercise, there has existed, since the advent of the automobile, a need for an automobile bicycle carrier which enables the bicycle owner to simply transport his bicycle or bicycles from place to place by means of his automobile. Consequently, a number of automobile bicycle carriers or racks have been developed as exemplified by the United States patents issued to Hyde, Patent No. 2,415,286; Iverson 2,431,400 and Donnelley 2,512,267. However, such prior art automobile bicycle carriers have included a number of shortcomings which have substantially prevented their widespread acceptance and use. Normally, the prior art automobile bicycle carriers were adapted to mount the bicycle on the bumper of the automobile. However, if the front bumper was utilized for such purpose, the bicycle frequently substantially interfered with the forward view of the automobile driver and the bicycle was easily damaged. Consequently, the bicycle was normally mounted on the rear bumper of the automobile. Yet, here again, the bicycle usually interfered with the rear vision of the driver and substantially blocked access to the trunk of the car. In addition, when mounted on the car bumper, the bicycle was in a substantially upright position which made it sensitive to vibrations in the car body caused by the normal car travel. This was particularly true where the only connection between the bicycle and the car was adjacent to the bumper. Also, the prior art automobile bicycle carriers normally involved several separate parts which could only be mounted on the bumper of the automobile and attached to the bicycle by means of tools, so that the installation and removal of the bicycle and the carrier was relatively time consuming and complicated. Also, any such mounting on the bumper required that the bicycle be oriented in a generally planar configuration. Consequently, frequently the bicycle would extend beyond the sides of the car, particularly the smaller cars, and thus constitute a traffic hazard.

In general, therefore, an object of the present invention is an easily installed and removed integral automobile bicycle carrier.

Another object of the present invention is an automobile bicycle carrier adapted to hold securely and compactly one, two, or more bicycles.

Still another object of the present invention is an automobile bicycle carrier adapted to mount the bicycle on the lid of a trunk and yet not substantially interfere with the driver's rear vision or block access to the trunk.

Other objects and advantages of the present invention will be readily apparent from the following description and drawings which illustrate exemplary embodiments of the present invention.

The present invention involves an automobile bicycle carrier comprising a base means enclosing a substantial area and attachment means adapted to fix the base means to a substantially horizontal surface portion of an automobile body. Mounted on the base means are frame support means which are adapted to hold the central portion of a frame of at least one bicycle, with the bicycle being in a horizontal position and substantially balanced on the frame support means. Also mounted on the base means is a wheel support means which is adapted to hold at least one bicycle, with the front wheel being positioned substantially perpendicular to the bicycle frame.

In order to facilitate understanding of the present invention, reference will now be made to the appended drawings of a preferred embodiment and an alternate embodiment of the present invention.

In the drawings:

FIG. 1 is a partially exploded perspective view of the specific embodiment of the automobile bicycle carrier of the present invention which is adapted to hold two bicycles.

FIG. 2 is a planar view of FIG. 1 showing the related positions of the various bicycle portions when mounted on the carrier.

FIG. 3 is a cross-sectional view of FIG. 1 taken along line 3—3 of FIG. 1.

FIG. 4 is a cross-sectional view of FIG. 1 taken along line 4—4 of FIG. 1.

FIG. 5 is a cross-sectional view of FIG. 1 taken along line 5—5 of FIG. 1.

FIG. 6 is a partially exploded perspective view of another specific embodiment of the automobile bicycle carrier of the present invention which is adapted to hold one bicycle.

FIG. 7 is a plan view of the automobile bicycle carrier shown in FIG. 6.

FIG. 8 is a perspective view of a modified form of the invention.

FIG. 9 is a side view of the form of the invention of FIG. 8.

As illustrated in FIGS. 1–5, the present invention involves an automobile bicycle carrier 10 including a base means 20 enclosing a substantial area and attachment means 30 adapted to fix said base means to a substantially horizontal surface portion of an automobile body. Mounted on the base means 20 are frame support means 40 which are adapted to hold the central portion 11 of a frame 12 of at least one bicycle 13 with the bicycle 13 being in a horizontal position and substantially balanced on the frame support means 40. Also mounted on the base means 20 are wheel support means 60 which are adapted to hold the front wheels 14 of the bicycle, with the front wheels 14 being positioned substantially perpendicular to the bicycle frame 12.

The base means 20 comprises a substantially planar set 21 of interconnected base bars 22, 23, 24 and 25. The base bars 22 and 24 consist essentially of confronting channel bars which are spaced apart and extend parallel to each other, while the base bars 23 and 25 consist essentially of the circular hollow tubes which are spaced apart and are spaced parallel to each other and connect the base bars 22 and 24 together to enclose a large rectangular area. The channel bars forming base bars 22 and 24 achieve a clamping action on the base bars 23 and 25 to insure a rigid construction.

Mounted on the base means 20 are attachment means 30 adapted to fix the base means 20 to a substantially horizontal surface portion of an automobile body. The attachment means 30 comprises four suction cups 31 with a nut (FIG. 5) affixed thereto. Threaded into and extending upwardly therefrom through bores 26 in the bars 22 and 24 are bolts 32. The attachment means 30 also includes adjustable mounting straps 35 connected at one end to the base means 20 by eyebolts 36 which extend through aperturers 27 in the base bars 22 and 24 and are connected thereto by washers 37 and wing nuts 38. The other ends of the mounting straps 35 are adapted to be connected to the automobile body of any suitable means, such as hooks or clamps.

Mounted on the base means 20 are frame support means 40 which are adapted to hold the central portions 11 of the frames 12 of two bicycles, with the bicycles being in a horizontal position and substantially balanced thereon. The frame support means 40 comprises two spaced posts 41 and 42 mounted on and extending upwardly from the base means 20. The posts 41 and 42 are fixedly connected adjacent their upper ends by clamping plates 43. Also, the posts 41 and 42 are fixedly connected at their lower ends to the base bars 23 and 25, respectively, by brace plates 44. The posts 41 and 42 come together at their upper ends to form a triangular configuration which defines a plane extending perpendicularly to the brace plates 44. In this way, the posts 41 and 42 are prevented from bending longitudinally along the base bars 23 and 25 by the base plates 44 and laterally to the base bars 23 and 25 by the triangular structure formed. The post 41 extends above the clamping plates 43 to form a first support column 45 having a clamping means 46 mounted on the upper end thereof. The clamping means 46 is adapted to hold securely the central brace 11 of the bicycle frame 12. The clamping means 46 comprises a lower cradle plate 47 fixed to the column 45 and an upper cradle plate 48 attached to the lower cradle plate 47 by bolts 49 and wing nuts 50. Also secured between the clamping plates 43 is a second support column 51 spaced from the first support column 45 and extending above and away therefrom. The second support column 51 also has a lower cradle plate 52 mounted on the top thereof and an upper cradle plate 53 connected to the lower cradle plate 52 by bolts 54 and wing nuts 55. The lower cradle plates 47 and 52 and upper cradle plates 48 and 53 each have a resilient inner lining 56 which is adapted to cushion a bicycle brace 11 when clamped therebetween.

Also mounted on the base means 20 are wheel support means 60 which are adapted to hold the front wheel 14 of the two bicycles, with the front wheel being positioned substantially perpendicular to the bicycle frame 12. The wheel support means 60 comprises an arm 61 formed as an extension of the base bar 25 and extending substantially horizontally from the base means 20. The arm 61 has wheel clamping means 62 mounted on the outer end thereof which are adapted to hold securely the front wheel, tire and rim. The wheel clamping means 62 comprises a first bracket 63 which is adapted to receive the wheel, tire and rim and a locking strap 64 which is adapted to be inserted in slots 65 of the bracket 63 to hold the wheel, tire and rim in place. Extending upwardly and away from the first bracket 63 is a bracket arm 66 supporting a second bracket 67 which similarly has a locking strap 68 which is adapted to be inserted in slots 69 of the second bracket 67. The first bracket 63 is adapted to cooperate with the upper and lower cradle plates 47 and 48 mounted on the first column 45 to hold one bicycle, while the second bracket 67 is adapted to cooperate with the upper and lower cradle plates 52 and 53 mounted on the second column 51 to hold a second bicycle.

To use the automobile bicycle carrier 10, it is initially assembled as illustrated in FIG. 1 by connecting the base bars 23 and 25 between the base bars 22 and 24 by screw-type connections. Then the suction cups 31 are attached to the base bars 22 and 24 by the bolts 32. Next, the posts 41 and 42 are connected to the base bars 23 and 25 by the brace plates 44 and are connected together by the clamping plates 43 and screw connectors When thus assembled, the automobile bicycle carrier 10 forms an integral unit which may be easily installed and removed from the automobile without the use of tools. The automobile bicycle carrier 10 may be installed simply by placing it in an appropriate position on the trunk lid or car roof and pressing downwardly so that the suction cups 31 grasp the surface of the car. Then the straps 35 are attached to the trunk lid or the roof of the car to insure the secure placement of the bicycle carrier 10 on the car. Bicycles may then be mounted on the bicycle carrier 10 simply by removing the upper cradle plates 48 and 53 and the locking straps 64 and 68. The central braces 11 of the bicycle frames 12 are then laid on the lower cradle plates 47 and 52, respectively, and the front wheels are rotated peripendicular to the bicycle frames 12, so that they are received in the brackets 63 and 67, respectively. The upper cradle plates 48 and 53 are then clamped into place by means of the bolts 49 and 54 and wing nuts 50 and 55 so that the bicycle as a whole is fixed in a substantially horizontal position and substantially balanced about the support columns 41 and 51. Then the locking straps 64 and 68 are inserted in the slots 65 and 69, respectively, to lock the front wheels in a position perpendicular to the bicycle frame 12. To remove the bicycles from the bicycle carrier 10, or the carrier 10 from the automobile, the process is simply reversed.

Another embodiment of the present invention is illustrated in FIGS. 6 and 7 showing a bicycle carrier 110 which is substantially similar to the embodiment of the present invention shown in FIGS. 1–5, but is adapted to carry only one bicycle. Similar to the embodiment shown in FIGS. 1–5, the bicycle carrier 110 includes a base means 120 comprising a set 121 of interconnected base bars 122, 123, 124 and 125. Mounted on the base means 120 are attachment means 130 adapted to fix the base means 120 in a substantially horizontal surface portion of an automobile body. The attachment means 130 comprises suction cups 131 having nuts fixedly attached thereto. Threaded into and extending upwardly through bores in the base bars 122 and 124 are bolts 132. The attachment means 130 also includes adjustable straps 135 connected at one end to the base means 120 by eyebolts 136 inserted in the base bars 122 and 124 and connected thereto by means of washers 137 and wing nuts 138. Mounted on the base means 120 is similarly a frame support means 140 which is adapted to hold the central portion 11 of a bicycle frame 12 of one bicycle in a horizontal position and substantially balanced on the frame support means 140. The frame support means comprises two spaced posts 141 and 142 mounted on and extending upwardly from the base bars 123 and 125 of the base means 120. The posts 141 and 142 are fixedly connected adjacent their upper ends by clamping plates 143. At their lower end, the posts 141 and 142 have brace plates 144 which connect them to the base bars 123 and 125. The posts 141 and 142 come together at their upper end in a triangular configuration which defines a plane extending perpendicular to the base plates 144. The frame support means 140 also includes frame clamping means 146 mounted on the upper end of the posts 141 and 142 and adapted to hold securely the central brace of the bicycle frame. The frame clamping means 146 comprises a lower cradle plate 147 mounted on a column 145 which is an extension of post 141. Connected to the lower cradle plate 147 is an upper cradle plate 148 which is attached thereto by means of bolts 149 and wing nuts 150. Also mounted on the base means 120 are wheel support means 160 which are adapted to hold the front wheel of the bicycle, with the front wheel being positioned substantially perpendicular to the bicycle frame. The wheel support means 160 comprises an arm 161 mounted on the base means 120 by means of an extension of the base bar 125 and extending substantially horizontal from the base means 120. Mounted on the outer end of the arm 161 are wheel clamping means 162 which are adapted to hold securely the front wheel tire and rim. The wheel clamping means 162 comprise a bracket 163 adapted to receive the wheel tire and rim and having a locking strap 164 which is adapted to be inserted in slots in the bracket 168.

From the foregoing brief description of the embodiment of the present invention illustrated in FIGS. 6 and 7, it can be seen that it may be assembled and installed and removed from an automobile in the same way as the embodiment shown in FIGS. 1–5. Similarly, a bicycle rack may be installed and removed from the automobile bicycle carrier 110 in the same way as bicycles may be installed and removed from the automobile bicycle carrier 110. In addition to the foregoing alternate embodiments of the present invention, it should be noted that there are many other specific embodiments possible. Thus, the base means 20 may have other than rectangular configurations, such as circular or triangular, as long as they cover a substantial area so that a wide base is achieved for supporting the bicycle. Similarly, a variety of means may be used to attach the various parts of the carrier together and attach the bicycles to the carrier.

FIGURES 8 and 9 show another modified form of the invention. This form of the invention is similar to the form of the invention shown in FIGURES 1 to 5 with certain differences. Corresponding parts in FIGURES 8 and 9 are identified by the same reference numerals primed. As shown, the base frame is a rectangular or square frame configurated of a length of cylindrical tubing. The frame may be mounted or secured to a flat surface of an automobile in the same manner as the embodiment of FIGURES 1 to 5.

The support means for the frame of the bicycle is in the form of an inverted tubular V-shaped member having legs 41' and 42'. The ends of these legs are received in tubular sockets formed in the brace plates 44' which are like those of the first embodiment. As shown, these brace plates form sockets to receive the legs 41' and 42' and the horizontal portions 23' and 25' of the base frame 20'. The inverted V-shape frame member having legs 41' and 42' has an integral extending upright arm or post 51' having clamping means at its upper end similar to the clamping means of the first embodiment.

The part 25' of the base frame 20' has an extension 61' which carries the clamping means 60' for the bicycle wheels. These clamping means are like those of the previous embodiment. In this form of the invention the suction cups 31 may be attached to the frame 20' as in the previous embodiment, or may be attached by other means such as by welding. As may be observed, the present form of the invention provides a simplified carrier which is extremely simple to produce, fabricate and assemble and thereby improves the economy and utility of the construction.

There are many features of the present invention which clearly show the significant advance the present invention represents over the prior art. Consequently, only a few of the more outstanding features will be pointed out to illustrate the unexpected and unusual results obtained by the present invention. One feature of the present invention is an automobile bicycle carrier adapted to be mounted on a horizontal portion of the car body, such as the trunk lid or the roof of the car. However, the carrier is designed so that when mounted on the trunk lid the bicycle or bicycles are supported substantially above the real window of the car so that the rear vision of the car driver is not substantially impaired. Furthermore, the mounting on the trunk lid still permits the trunk lid to be opened and thus does not obstruct access to the trunk of the car. Another feature of the present invention is the horizontal positioning of the bicycles so that they have a low center of gravity with reference to their support means and thus are resistant to the car body vibration and may be firmly secured in place. Still another feature of the present invention is the mounting of the bicycles so that the bicycle front wheels are supported perpendicular to the bicycle frame and thus a more compact storage of the bicycle is achieved. Consequently, the bicycles may be stored on a relatively small car without extending beyond the sides of the car. Still another feature of the present invention is an automobile bicycle carrier which is formed as an integral unit when assembled which can be easily installed and removed from the car body without the use of tools. Still another feature of the present invention is the balanced mounting of the bicycle carrier so that any vibrations imparted to the bicycle by the car body are quickly dampened and the bicycle can be securely held simply by a support clamped to a central brace and a secondary brace on the front wheel.

It will be understood that the foregoing description and examples are only illustrative of the present invention and it is not intended that the invention be limited thereto. All substitutions, alterations and modifications of the present invention which come within the scope of the following claim or to which the present invention is readily susceptible without departing from the spirit and scope of this disclosure are considered part of this invention.

We claim:

An easily installed and removed automobile bicycle carrier adapted to hold securely and compactly at least one bicycle comprising: base means comprising an integral rectangular tubular frame, attachment means adapted to fix said base means to a substantially horizontal surface portion of an automobile body, bicycle frame support means mounted on said base means, said support means being constructed to hold the central portion of a frame of at least one bicycle with said bicycle being in a horizontal position and substantially balanced on said frame support means, said support means comprising an integral inverted V-shaped frame member having legs attached to said base frame, said support means having an extending arm and frame clamping means mounted on the upper part of said inverted V-shaped frame and said extending arm adapted to hold securely the central member of a bicycle frame, and wheel support means mounted on said base frame, said wheel support means being adapted to hold the front wheel of at least one bicycle with said front wheel being positioned substantially perpendicular to the bicycle frame and said wheel support means comprising an integral extension from a part of said base frame and wheel clamping means mounted on the outer end of said extension and adapted to hold securely the front wheel tire and rim.

No references cited.

GERALD M. FORLENZA, *Primary Examiner.*

F. WERNER, *Assistant Examiner.*